US010533731B2

(12) United States Patent
Blandin et al.

(10) Patent No.: US 10,533,731 B2
(45) Date of Patent: Jan. 14, 2020

(54) BI-MATERIAL TRANSMITTING OPTICAL ELEMENT

(71) Applicant: Valeo North America, Inc., Troy, MI (US)

(72) Inventors: Jonathan Blandin, Columbus, IN (US); Gavin Warner, Seymour, IN (US); Brian Guinn, Columbus, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/646,734

(22) Filed: Jul. 11, 2017

(65) Prior Publication Data

US 2019/0017683 A1   Jan. 17, 2019

(51) Int. Cl.
| | | |
|---|---|---|
| *F21V 17/08* | (2006.01) | |
| *F21V 9/04* | (2018.01) | |
| *F21V 29/70* | (2015.01) | |
| *F21V 29/89* | (2015.01) | |
| *F21V 19/00* | (2006.01) | |
| *F21V 8/00* | (2006.01) | |
| *F21Y 115/10* | (2016.01) | |

(52) U.S. Cl.
CPC ............... *F21V 17/08* (2013.01); *F21V 9/04* (2013.01); *F21V 19/0015* (2013.01); *F21V 29/70* (2015.01); *F21V 29/89* (2015.01); *G02B 6/0096* (2013.01); *F21Y 2115/10* (2016.08)

(58) Field of Classification Search
CPC .......... B60Q 3/64; B60Q 3/78; B60Q 1/0011; B60Q 1/2696; B60Q 3/51; B60Q 3/54; B60Q 3/62

USPC ................................ 362/459–549, 551–582
See application file for complete search history.

(56) References Cited

U.S. PATENT DOCUMENTS

| | | | | |
|---|---|---|---|---|
| 7,349,163 B2* | 3/2008 | Angelini | ............... | F21V 3/04 362/555 |
| 8,573,823 B2* | 11/2013 | Dau | .................. | G02B 6/0045 362/222 |
| 2014/0355078 A1* | 12/2014 | Fujiuchi | ......... | H04N 1/02825 362/558 |

(Continued)

FOREIGN PATENT DOCUMENTS

| | | |
|---|---|---|
| DE | 10 2012 211821 A1 | 6/2014 |
| DE | 20 2016 100257 U1 | 3/2016 |

(Continued)

OTHER PUBLICATIONS

European Search Report issued in European Patent Application No. 18182727.0 dated Nov. 27, 2018.

*Primary Examiner* — William J Carter
(74) *Attorney, Agent, or Firm* — Oblon, McClelland, Maier & Neustadt, L.L.P.

(57) ABSTRACT

A lighting assembly having a mounting structure, an LED mounted on the mounting structure, an optical device optically coupled to the LED, and a support structure for connecting the optical device to the mounting structure. The LED is enclosed within a space formed by the mounting structure, the support structure, and the optical device. The support structure absorbs thermal energy to reduce an operating temperature of the optical device. The optical device may be formed from a first material and the support structure may be formed from a different, second material.

20 Claims, 3 Drawing Sheets

(56) References Cited

U.S. PATENT DOCUMENTS

2015/0146450 A1* 5/2015 Iordache ............ G02B 27/1006
362/555
2016/0082629 A1 3/2016 Modi

FOREIGN PATENT DOCUMENTS

EP          2 801 751 A2   11/2014
EP          2 886 949 A2    6/2015

* cited by examiner

BI-MATERIAL TRANSMITTING OPTICAL ELEMENT

BACKGROUND

Field of the Disclosure

The present disclosure is directed toward a bi-material transmitting optical element and method.

Description of the Related Art

Use of semiconductor-based lighting systems is increasingly common in the automotive industry. Design constraints of the vehicle environment and aesthetic considerations often make it desirable to use optical components to transport and/or diffuse light from the light emitting element to a remote point of illumination. Such optical components should be made of material with high optical efficiency and be carefully aligned with the light emitting element to minimize loss of the light output at the point of illumination. Further, optical performance should withstand mechanical stresses (e.g., vibration), thermal stresses and penetration of moisture to the greatest extent possible.

Areas for development include alignment and precision of the LED projection, thermal management, reliability and durability, ease and quality of manufacturing, and possibly reduced labor and material costs. Thus, continued innovation and refinement of materials and manufacturing processes are important contributors toward the introduction of improved LED-based lighting systems.

SUMMARY

The present disclosure is directed to a lighting assembly having a mounting structure, an LED mounted on the mounting structure, an optical device optically coupled to the LED, and a support structure for connecting the optical device to the mounting structure. The LED is enclosed within a space formed by the mounting structure, the support structure, and the optical device. The support structure absorbs thermal energy to reduce an operating temperature of the optical device.

In another aspect, the heat sink is formed from a thermally conductive material.

In another aspect, the thermally conductive material is at least one of aluminum and an aluminum alloy.

In another aspect, the optical device is formed from a first material and the support structure is formed from a different, second material.

In another aspect, at least one of the first material and the second material is a thermoplastic.

In another aspect, the first material is a PMMA.

In another aspect, the second material is polycarbonate.

In another aspect, the second material is opaque in the visible and infrared light ranges. For example, the second material may absorb near-infrared wavelength under 1000 nm or under 1500 nm.

In another aspect, the optical device s a light pipe.

In another aspect, the optical device is connected to the support structure by mechanical contact.

In another aspect, the optical device is connected to the support structure by a tongue-and-groove joint.

In another aspect, the optical device is connected to the support structure by an angled tongue-and-groove joint.

In another aspect, the lighting assembly forms part of a signaling device, an exterior lighting assembly, or an interior lighting assembly.

In another non-limiting illustrative example, a process for molding an integrated optical device and support structure assembly includes the steps of injecting a first material into a mold to form the optical device portion of the assembly, waiting an amount of time, injecting a second material into the mold to form the support structure portion of the assembly, and releasing the assembly from the mold.

In another aspect, the step of injecting a second material further includes injecting the second material around the first material of the optical device portion of the assembly.

In another aspect of the method at least one of the first material and the second material is a thermoplastic.

In another aspect of the method, the first material is a PMMA.

In another aspect of the method, the second material is polycarbonate.

In another aspect of the method, the second material is opaque in the visible and infrared light ranges. For example, the second material may absorb infrared wavelength under 1000 nm or under 1500 nm.

In other aspects of the method, the optical device is connected to the support structure by at least one of a mechanical contact, a tongue-and-groove joint and an angled tongue-and-groove joint.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

Figure 1:
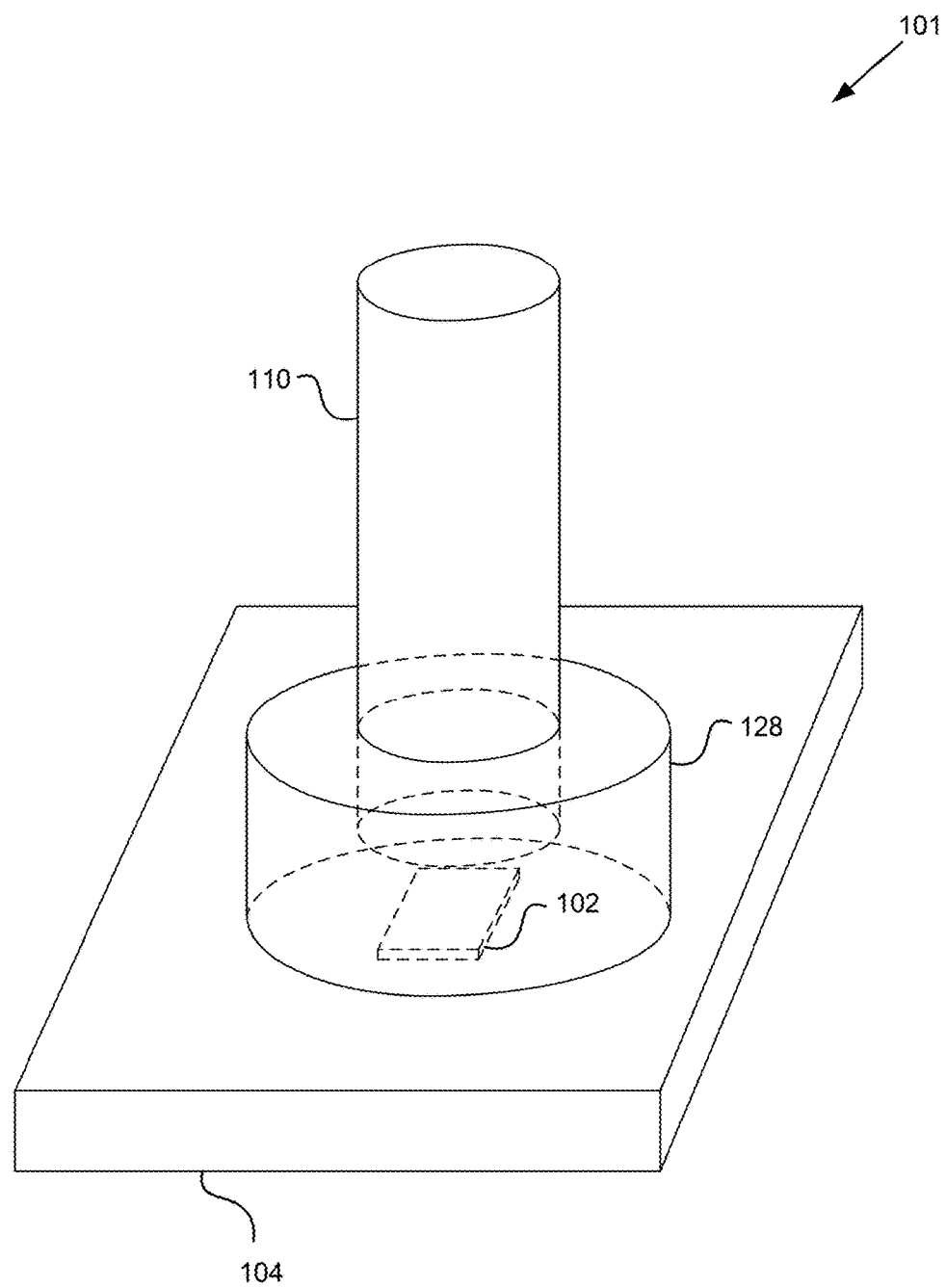
FIG. 1 is a diagram of a lighting assembly having a heat sink connected to a fixation assembly, according to one example.

Referring now to the drawings, as used herein, the words "a" "an" and the like generally carry a meaning of "one or more", unless stated otherwise.

FIG. 1 is a diagram of a lighting assembly 101 having a mounting structure 104 connected to a fixation assembly 128, according to one example. The mounting structure may be one or more of a printed circuit board (PCB), heat sink or any suitable structure on which an LED may be mounted. In one embodiment, the mounting structure includes a printed circuit board to which the LED is mounted, as well as a heat sink thermally coupled to the ED. The mounting structure 104 may serve as a base to which the fixation assembly 128 is mounted and upon which the fixation assembly 128 is positioned. The mounting structure 104 may provide the lighting assembly 101 with thermal capacity to store and dissipate excess heat generated by operation of the lighting assembly 101, particularly from an LED 102.

The fixation assembly 128 serves as a support structure and may be connected to an optical device represented as a light pipe 110 in the figure. The light pipe 110 may be positioned in a substantially perpendicular direction relative to the heat sink 104. In other examples, the fixation assembly 128 may include other componentry rather than the light pipe 110 such as a collimator lens, a collector lens, or other optical element. In conventional lighting assemblies, the fixation assembly 128 is made from the same material as the light pipe for ease of manufacturing, and may encapsulate the LED 102 to prevent moisture exposure thereto. However, the inventors recognized that such configuration often results in sub-optimal design and/or operation of the assembly to compensate for heat from the LED 102 (including convection and radiation), which may have an effect on the material properties of the fixation assembly 128 and the light pipe 110.

In one example, the intensity of the heat from the LED 102 may be such that electrical current to the LED 102 may be de-rated to operate at below the maximum limit of the LED 102 to protect thermal limits of the light pipe 110 and/or the fixation assembly 128, rather than the LED 102. Further, the light pipe 110 may have to be positioned farther from the LED 102 than is ideal for light transmission purposes but, again, limiting material properties of the light pipe 110 may necessitate such positioning of the light pipe 110 with respect to the LED 102. Heat from the LED 102 may also be absorbed and then conducted by the fixation assembly 128 to the heat sink 104 where it is dissipated.

In the interest of extending performance of such systems, including that of components such as optical devices and fixation assemblies, especially with respect to optical efficiency, thermal effectiveness, and increasing light output, careful design and material selection should be made. The inventors recognized that materials that may be optically efficient may have relatively low temperature thresholds, and are thus not well suited to meeting certain thermal requirements. Conversely, materials that may have suitable thermal properties may not be optically efficient. Further, durability and reliability of the lighting systems may depend on operating temperatures and assembly, so much so that electrical current directed to LED elements may be reduced or de-rated in order to reduce thermal loads that optical devices may be subject to, and therefore reducing the brightness and optical effectiveness of the lighting system.

In one example of the invention, the fixation assembly 128 may be made, at least in part, of a different material than the light pipe.

Figure 2A:
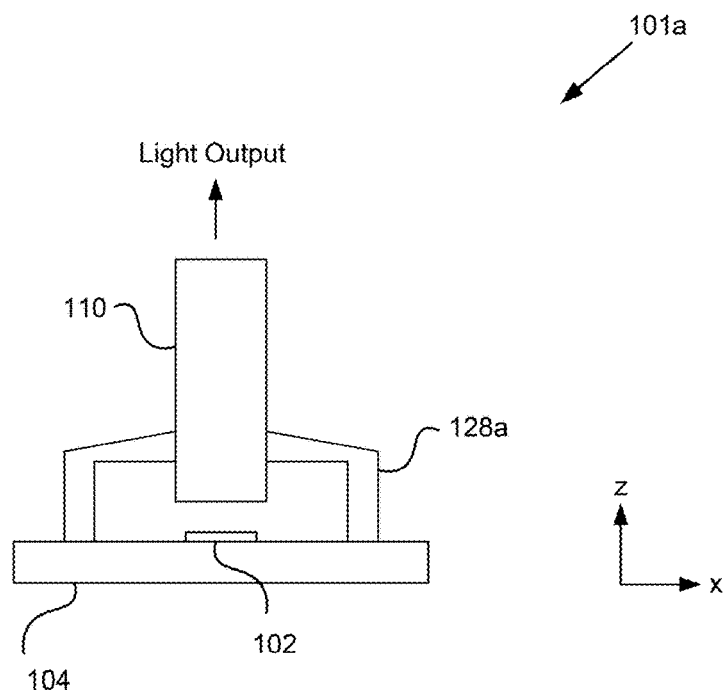
FIG. 2A is a schematic diagram of a lighting assembly, according to one example.

FIG. 2A is a schematic diagram of a lighting assembly 101a, according to one example of the invention. As seen, the fixation assembly 128a may include the light pipe 110, and may be connected to a heat sink 104. The LED 102 may also be mounted on the heat sink 104, positioned below the light pipe 110 and optically coupled to a first end of the light pipe 110 such that at least some, and preferably all, light emitted by the LED 102 may be directed into the first end of the light pipe 110 and out a second end of the light pipe 110.

The light pipe 110 may be connected to the fixation assembly 128a such that a longitudinal axis of the light pipe 110 is approximately located along a vertical z-axis. Further, the fixation assembly 128a may be connected to or surround the light pipe 110 enclosing a region between the first end of the light pipe 110 and the heat sink 104, such that the fixation assembly 128a, the heat sink 104, and the light pipe 110 enclose the LED 102 and light emitted by the LED 102. The LED 102 is typically not sealed such that it can vent to atmosphere for pressure and humidity control. However, in some situations, the LED 102 may be hermetically sealed to minimize exposure of the LED 102 to moisture. The fixation assembly 128a may support the light pipe 110 above the LED 102 and the heat sink 104 such that the light pipe 110 does not directly contact the heat sink 104. The light pipe 110 and the fixation assembly 128a may be formed of different materials with different optical, thermal, and mechanical properties, allowing the lighting assembly 101a to achieve improved performance compared with the fixation assembly 128a and the light pipe 110 were formed from only one material. The light pipet 10 and holder assembly 128a, 128b are typically not sealed to an LED PCB board due to thermal constraints.

The light pipe 110 may be formed from a material, for example, a thermoplastic such as acrylic, acrylic glass, or polymethyl methacrylate (PMMA), to optimize Total Internal Reflection (TIR) or other optical properties of the light pipe 110. Further, material selection for, and/or design of, the light pipe 110 may then have less emphasis on thermal properties if the fixation assembly 128a is formed from a design and/or a material with superior thermal properties to absorb, conduct, or deflect sufficient heat such that less thermal energy is conducted to the light pipe 110. The light pipe 110 may then be subjected to a thermal operating range, primarily thermal energy from the LED 102, that is not more than can be handled by the light pipe 110 and the material properties of the light pipe 110.

The fixation assembly 128a may be designed to optimize thermal and mechanical properties of the lighting system. For example, the fixation assembly may be designed to absorb, block or deflect heat (convection, conduction and radiation) from the LED and/or heat sink. Heat conducted from the LED to the support structure can cause plastic deformation and failure of the system due to poor optical alignment, for example. Thus, in some embodiments, the fixation assembly provides a mechanically robust fixation of the light pipe even in a hot environment.

In one example, a temperature difference between an operating temperature of the light pipe 110 and the fixation assembly 128a may be approximately in the range of 30 to 35 degrees Celsius, the fixation assembly 128a operating at a higher temperature than that of the light pipe 110. The ability to decouple the material properties of the light pipe 110 from those of the fixation assembly 128a by using more than one material may allow for selection of material properties for each component for specific temperature ranges and other properties. This can extend the overall performance limits of the fixation assembly 128a to durably allow brighter and more efficient light output from the LED 102 (such as through increased electrical current) to be directed through to the second end of the light pipe 110.

In one example, the TIR efficiency of the light pipe 110 may be increased by forming the light pipe 110 from a first material specific for that purpose, the first material needing thermal properties to durably meet a first temperature limit. Further, the fixation assembly 128a may be formed from a second material, the second material able to durably meet a second temperature limit that is higher than the first temperature limit and having a suitable thermal conductivity for conducting heat generated by the LED 102 through to the heat sink 104 at a rate that meets or exceeds performance requirements. The first material may have superior optical properties (e.g., TIR at a given wavelength) to that of the second material, and the second material may have superior them mal conductivity to that of the first material. While PMMA and PC are provided as exemplary materials for the light pipe 110 and the fixation assembly 128a, respectively, one skilled in the art would recognize that the light pipe 110 and the fixation assembly 128a may be formed from a wide variety of materials suitable to meet the optical, thermal and mechanical requirements of a particular application of the lighting assembly.

Figure 2B:
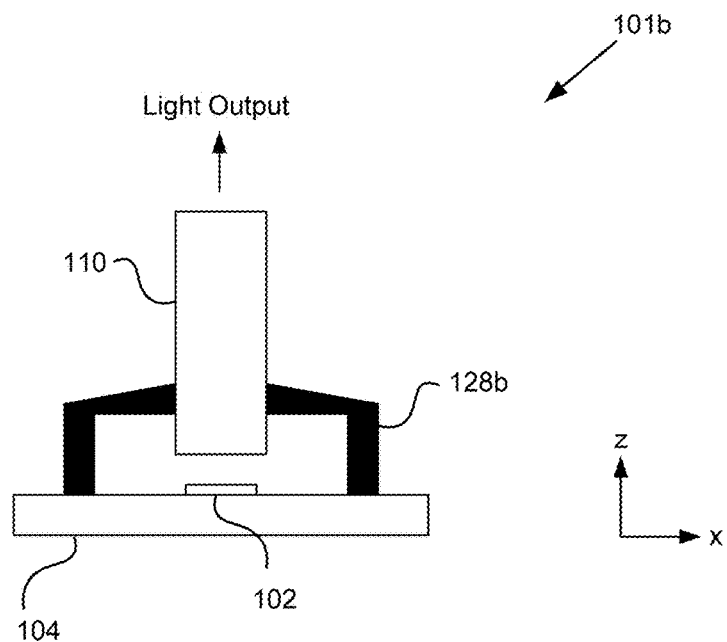
FIG. 2B is a schematic diagram of a lighting assembly, according to one example.

FIG. 2B is a schematic diagram of a lighting assembly 101b, according to one example. The fixation assembly 128b may include the light pipe 110 and a fixation assembly 128b connected to the heat sink 104. The fixation assembly 128b may be identical to fixation assembly 128a with the exception that at least a portion of the fixation assembly 128b may be opaque in the visible and infrared light ranges, or black in color to avoid light leakage through the fixation assembly 128b. For example, the second material may absorb infrared wavelength under 1000 nm or under 1500 nm.

As a result, a greater proportion of light emitted by the LED 102 may then be directed through the light pipe 110 rather than diffused through the fixation assembly 128b as might occur through light leakage if at least a portion of the fixation assembly 128b was not opaque or black.

Figure 3A:
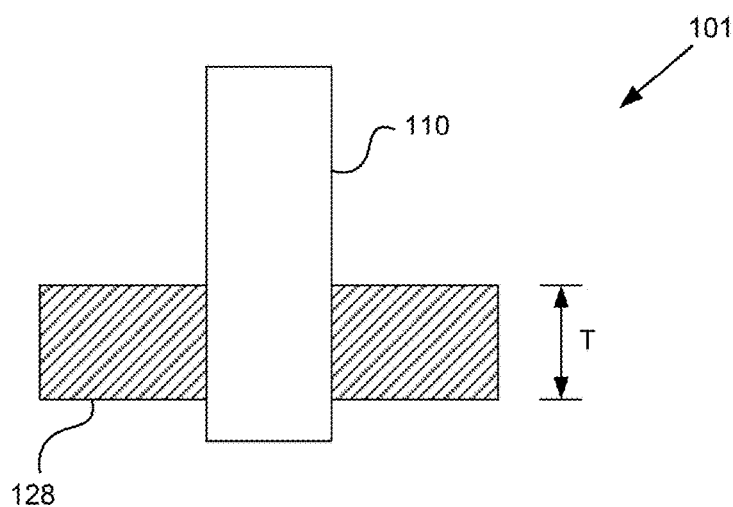
FIGS. 3A, 3B and 3C are schematic diagrams of joints between the fixation assembly and the light pipe, according to one example.
Figure 3B:
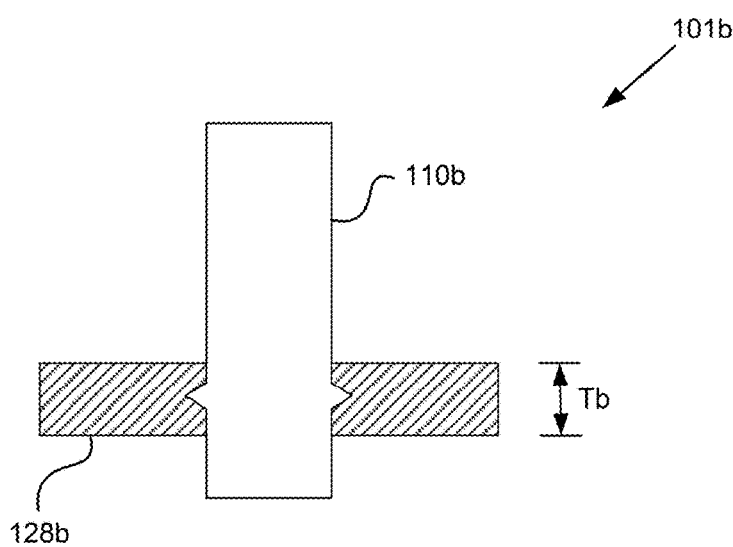
Figure 3C:
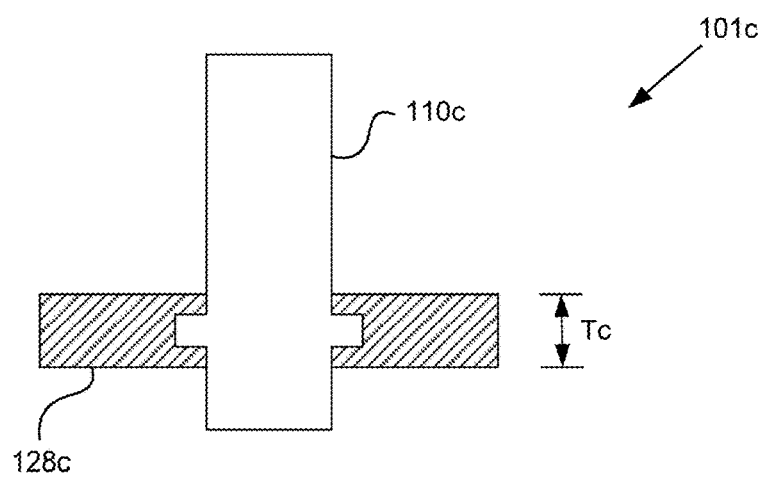

Further, in some embodiments, the area of contact between the fixing assembly 128 and the light pipe 110 may be selected to minimize optical losses of the light pipe 110. In particular, the present inventors recognized that interruption of the cylindrical outer surface of the light pipe 110 can reduce the efficiency with which light can be transmitted to the output end of the light pipe by TIR. Thus, in one embodiment the contact area is selected to meet the minimum mechanical strength requirement and to preserve optical efficiency of the light pipe to the greatest extent. In some embodiments, the interface of the fixation assembly and the light pipe may be modified to improve mechanical coupling, which may improve the optical efficiency possible for a given application. FIGS. 3A-3C are diagrams of joints between the fixation assembly 128 and the light pipe 110, according to one example. In FIG. 3A, the fixation assembly 128 may surround the light pipe 110 or other optical device to secure the light pipe 110 to the fixation assembly 128, creating a joint between the light pipe 110 and the fixation assembly 128. The joint may be formed from mechanical contact during a manufacturing process, such as overmolding where the fixation assembly 128 and the light pipe 110 may be molded from distinct materials in one process and in one mold, such as injection of a first material to form the light pipe 110 followed by injection of a second material to form the fixation assembly 128. In such a case, it may be advantageous for the fixation assembly 128 to have a higher shrinkage rate than that of the light pipe 110. With this configuration, the joint formed between the fixation assembly 128 and the light pipe 110 has an amount of mechanical interference that further strengthens the joint and locks the components together, preferably without introducing stresses that may otherwise negatively affect the durability or performance of the lighting assembly 101.

FIG. 3A illustrates a butt joint where the light pipe 110 may be pressed into the fixation assembly 128, and a nominal interference fit holds the two parts together. Transfer of thermal energy between the fixation assembly 128 and the light pipe 110 may be a function of surface area contact between the two. For optimal thermal efficiency between the two parts, surface area contact should be minimized. More surface area contact may be needed between the two parts to provide sufficient friction or interference than compared with examples of FIGS. 3B and 3C. For example, a thickness T of the fixation assembly 128 may have to be greater than a thickness Tb of the 128b (FIG. 38) or a thickness Tc of the 128c (FIG. 3C) to provide a comparable joint between the light pipe 110 and the fixation assembly 128 as between the light pipe 1101) and the fixation assembly 128b, or between the light pipe 110c and the fixation assembly 128c.

FIGS. 3B and 3C illustrate different joint configurations from that of FIG. 3A that may allow less surface area contact and may withstand more mechanical forces and vibration. In one example, the light pipe 110b and the fixation assembly 128h may be joined by an angled tongue-and-groove joint. In another example, the light pipe 110c and the fixation assembly 128c may be joined by a tongue-and-groove joint. The thermal efficiency of these examples may be higher than that illustrated by FIG. 3A. However, the optical efficiencies may be affected, possibly through lower TIR efficiency, by surface irregularities of the interiors of the light pipes 110b, 110c in the vicinity of where the fixation assemblies 128b, 128c contact the light pipes 110b, 110c, respectively.

Each assembly having a light pipe 110, 110b, 110c and a corresponding fixation assembly 128, 128b, 128c may be molded in one integrated process using different materials for each component. In one example, a method for molding an integrated optical device and support structure assembly may include injecting a first material into a mold to form a light pipe 110 portion, and possibly after an amount of time, injecting a second material into the mold to form the fixation assembly 128 portion, the second material surrounding some or all of the areas around the light pipe 110 formed from the first material. Once the second material is injected into the mold, the entire assembly may be released from the mold.

Thus, the foregoing discussion discloses and describes merely exemplary embodiments of the present application. As will be understood by those skilled in the art, the present application may be embodied in other specific forms without departing from the spirit or essential characteristics thereof. Accordingly, the disclosure of the present application is intended to be illustrative, but not limiting of the scope of the application, as well as other claims. The disclosure, including any readily discernable variants of the teachings herein, define, in part, the scope of the foregoing claim terminology such that no inventive subject matter is dedicated to the public.

What is claimed is:

1. A lighting assembly comprising:
   a mounting structure;
   an LED mounted on the mounting structure;
   an optical device optically coupled to the LED such that light emitted from the LED is directed into a first end of the optical device and exits from a second end of the optical device; and
   a support structure for connecting the optical device to the mounting structure, wherein
   the LED is enclosed within a space formed by the mounting structure, the support structure, and the optical device, and the support structure absorbs thermal energy to reduce an operating temperature of the optical device,
   the support structure includes a top wall through which the optical device passes, and a side wall having a first end continuous with a bottom surface of the top wall and a second end abutting the mounting structure,
   the first end of the optical device is spaced apart from the bottom surface of the top wall so as to be free of contact with the support structure, and the first end of the optical device is open to air such that the light is able to enter the optical device from bottom and side surfaces of the first end of the optical device.

2. The lighting assembly according to claim 1, wherein: the mounting structure comprises a heat sink formed from a thermally conductive material.

3. The lighting assembly according to claim 2, wherein: the thermally conductive material is at least one of aluminum and an aluminum alloy.

4. The lighting assembly according to claim 1, wherein: the optical device is formed from a first material and the support structure is formed from a different, second material.

5. The lighting assembly according to claim 4, wherein: at least one of the first material and the second material is a thermoplastic.

6. The lighting assembly according to claim 5, wherein: the first material is a PMMA.

7. The lighting assembly according to claim 5, wherein: the second material is polycarbonate.

8. The lighting assembly according to claim 5, wherein: the second material absorbs visible light and near-infrared light.

9. The lighting assembly according to claim 1, wherein: the optical device is a light pipe.

10. The lighting assembly according to claim 1, wherein: the optical device is connected to the support structure by mechanical contact.

11. The lighting assembly according to claim 1, wherein: the optical device is connected to the support structure by a tongue-and-groove joint.

12. The lighting assembly according to claim 1, wherein: the optical device is connected to the support structure by an angled tongue-and-groove joint.

13. The lighting assembly according to claim 1, wherein the lighting assembly forms part of a signaling device, an exterior lighting device, or an interior lighting device.

14. A method for molding an integrated optical device and support structure assembly comprising:

injecting a first material into a mold to form an optical device portion of the assembly, the optical device portion including a first end and a second end;

waiting an amount of time;

injecting a second material into the mold to form a support structure portion of the assembly; and releasing the assembly from the mold, wherein the support structure portion includes a top wall through which the optical device passes, and a side wall having a first end continuous with a bottom surface of the top wall and a second end, wherein the first end of the optical device portion and the second end of the optical device portion are both spaced apart from the bottom surface of the top wall so as to be free of contact with the support structure portion, and wherein the first end of the optical device portion is open to air such that the light is able to enter the optical device from bottom and side surfaces of the first end of the optical device portion.

15. The method according to claim 14, wherein the step of injecting a second material further includes injecting the second material around the first material of the optical device portion of the assembly.

16. The method according to claim 14, wherein at least one of the first material and the second material is a thermoplastic.

17. The method according to claim 14, wherein the first material is a PMMA.

18. The method according to claim 14, wherein the second material is polycarbonate.

19. The method according to claim 14, wherein the second material the second material absorbs visible light and near-infrared light.

20. The method according to claim 14, wherein the optical device portion is connected to the support structure portion by at least one of a mechanical contact, a tongue-and-groove joint and an angled tongue-and-groove joint.

* * * * *